Sept. 29, 1959 P. C. BOWSER ET AL 2,906,526
AIR SUSPENSION LEVELLING DEVICE
Filed July 5, 1957 2 Sheets-Sheet 1

INVENTOR.
Philip C. Bowser &
BY Richard E. Denzee
R. F. Barnard
ATTORNEY

Sept. 29, 1959   P. C. BOWSER ET AL   2,906,526
AIR SUSPENSION LEVELLING DEVICE
Filed July 5, 1957   2 Sheets-Sheet 2
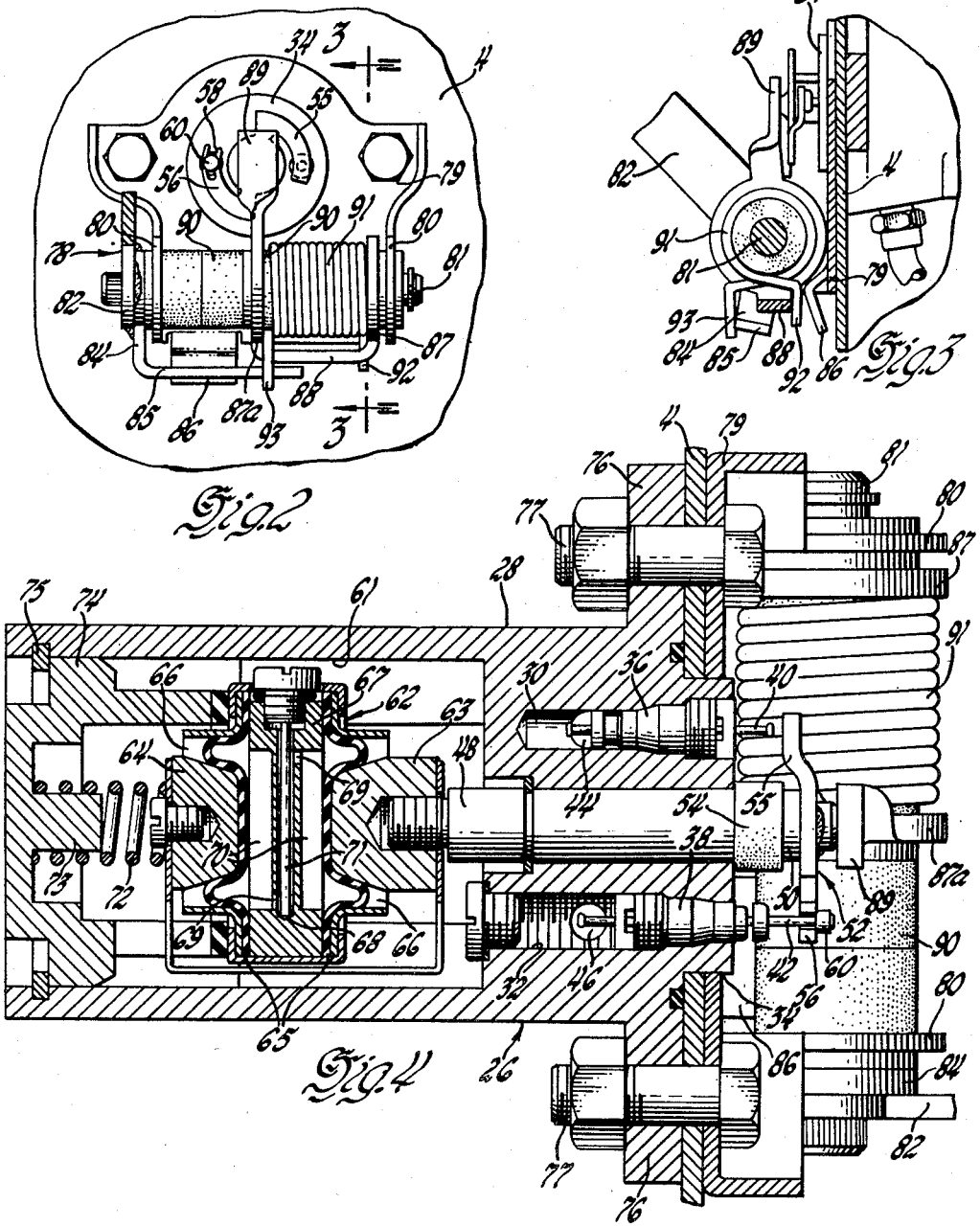
INVENTOR.
Phillip C. Bowser &
BY Richard E. Denzer
R. F. Barnard
ATTORNEY

United States Patent Office 2,906,526
Patented Sept. 29, 1959

2,906,526

AIR SUSPENSION LEVELLING DEVICE

Phillip C. Bowser, Mount Clemens, and Richard E. Denzer, East Detroit, Mich., assignors to General Motors Corporation, Detroit, Mich., a corporation of Delaware Application July 5, 1957, Serial No. 670,287

10 Claims. (Cl. 267—65)

This invention relates to a pneumatic suspension and, more particularly, to control mechanism for introducing and exhausting air from pneumatic springs so as to maintain a constant relative displacement between the sprung and unsprung portions associated with the spring.

Devices for regulating the standing height of vehicles equipped with pneumatic suspension systems are commonly referred to as levelling valves. In the prior art, levelling valves have generally fallen into two principal classes. By far the most common type of levelling valve is mounted on the sprung mass adjacent the air spring and provided with suitable linkage connections with the unsprung vehicle mass so that the valve mechanism is moved from a neutral position to either an intake or exhaust position responsive to corresponding variations in displacement of the relatively movable portions of the spring. It has also been proposed to dispose both the levelling valve and its associated operating connections entirely internally of the air spring. While the latter system offers several distinct advantages such as maximum protection of the operating parts, elimination of a conduit from the valve body to the spring, and elimination of certain pressure seals in the valve casing, the various forms of internal levelling valves in the prior art possess certain inherent disadvantages and limitations which seriously detract from their usefulness as a practical matter.

Perhaps foremost among the disadvantages of internal levelling valves known heretofore is the difficulty, if not impossibility, of performing maintenance thereon for replacing the valve mechanism without dismantling the entire spring assembly. Further, known types of internal valves have involved operating mechanisms which were either unreliable due to impositive driving connections or exceedingly difficult to install initially.

An object of the present invention is to provide an air spring levelling valve structure in which the convenience and accessibility of externally mounted levelling valves are combined with the several advantages of internal levelling valves.

A further object and feature of this invention is to provide a levelling valve structure which is mounted in direct communicating relation with the air spring in such a manner that all service functions may be performed without dismantling the air spring.

Another object and feature of this invention is to provide an air spring levelling valve mechanism which includes inlet and exhaust valve structures mounted in a housing demountably supported on the exterior of the air spring and provided with an operating structure disposed internally of the spring.

More particularly, it is a principal feature and object of this invention to provide an air spring levelling valve mechanism including externally mounted inlet and exhaust valves and a control mechanism therefor which is demountably secured to the air spring for easy removal and maintenance.

These and other objects, features and advantages of this invention will become more fully apparent as the description of the invention proceeds and in which reference is made to the accompanying drawings in which:

Figure 2 is a view taken on line 2—2 of Figure 1;

Figure 3 is a view taken on line 3—3 of Figure 2; and

Figure 4 is an enlarged view of the levelling valve taken on line 4—4 of Figure 1.

Figure 1:
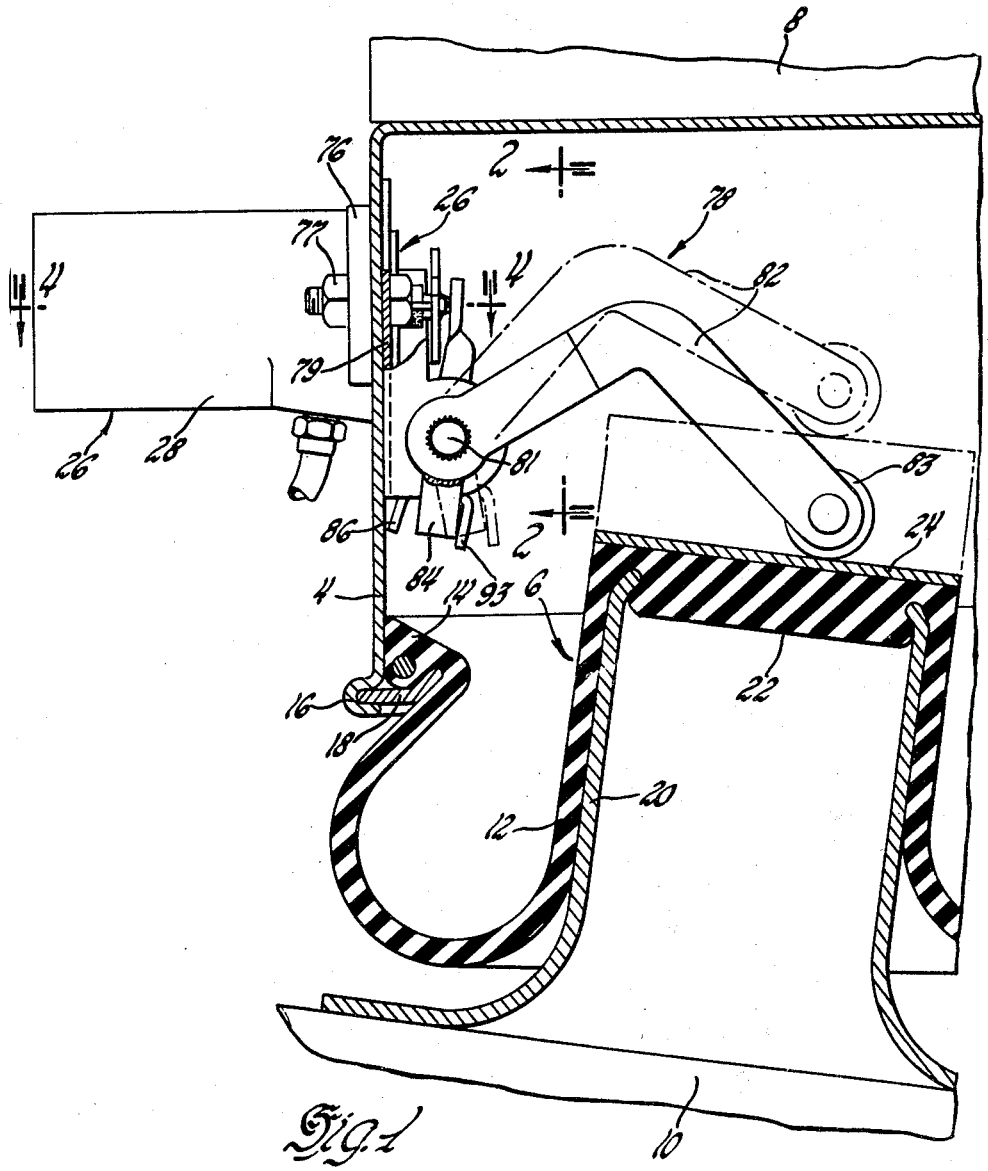
Figure 1 is a cross sectional view of a typical vehicle air spring incorporating a levelling valve construction according to the present invention.

Referring now to the drawings and particularly Figure 1, there is shown an air spring assembly comprising an inverted cup-shaped dome or cylinder element 4 which, in a vehicle suspension, is rigidly secured to the sprung load-supporting portion 8 of the vehicle. Extending upwardly into the air dome 4 is a piston 6 which, in the illustrated embodiment, is rigidly secured to a support 10 which is operatively connected to a vehicle wheel suspension arm (not shown) so that the piston 6 reciprocates in the dome 4 responsive to relative movement of the vehicle sprung and unsprung masses. In order to form a deformable variable volume air-confining cavity between the dome 4 and piston 6, the latter includes an annular flexible diaphragm 12 which has a beaded outer periphery 14 supported at the lower terminal lip 16 of the dome 4 by means of a ring flange 18. Ring 18 is supported on the dome 4 by spinning over the lip 16. The cylindrical member 20 forming a part of piston 6 is open to receive a relatively large annular boss 22 formed on the central portion of the diaphragm 12. The upper terminal end of the wall of the cylindrical member 22 is tapered inwardly to aid in firmly securing the diaphragm in this position. Disposed over the top of the diaphragm 12 is a metal cap structure 24 which may be secured thereto in any suitable manner.

Referring more particularly to Figure 4, in order to regulate or control the introduction and exhaust of air into and out of the spring, a levelling valve mechanism 26 is provided. This levelling valve mechanism includes a substantially cylindrical housing 28 having two spaced parallel passages or bores 30 and 32 formed therein and communicating through a nose or projecting pilot portion 34 at one end of the housing 28 to the exterior of the latter. An air inlet valve body 36 is disposed in the passage 30 while an outlet valve body 38 is disposed in the passage 32. These valves are conventional one-way spring biased normally closed check valves commonly known as the Schrader type which include actuable valve stems 40 and 42, respectively. The inlet valve opens when moved to the left and the exhaust valve opens when moved to the right, as viewed in Figure 4. Ports 44 and 46, respectively, place the passages 30 and 32 in communication through suitable conduits with a source of fluid under pressure and a low pressure return tank or atmosphere.

A valve actuating plunger 48 is reciprocably disposed within the housing 28 centrally of the valve passages and includes an external portion 50 projecting out of the pilot portion 34 of the housing on which a valve actuating or control plate 52 is rigidly secured. A suitable annular bushing 54 surrounds the plunger portion 50 and is engageable with the outer wall of the pilot portion 34 and the control plate 52 to limit reciprocating movement of the latter toward said housing thereby precluding damage to the inlet valve 36 and limiting its opening movement.

Referring for the moment more specifically to Figure 2, it may be seen that the control plate 52 includes opposed arcuate arms 55 and 56, the arm 55 being disposed opposite the inlet valve stem 40 for driving engagement therewith as will appear more fully hereinafter, while the arm 56 has a slot 58 therein through which the outlet valve stem 42 projects. A small collar 60 is formed on the end of the outlet valve stem 42 thereby forming a one-way drive connection between the arm 56 and the outlet valve stem.

The valve actuating or control plunger 48 extends inwardly of the valve housing into a cylindrical cavity or chamber 61 formed therein. A double acting fluid dashpot 62 of any well known type is mounted within this cavity. Such a dashpot may include a piston element 63 operatively rigidly secured to the plunger 48 and a second piston element 64 opposed thereto. These pistons each engage flexible diaphragms 65 having their peripheral edges firmly seated between the radially outwardly extending flanges of skirt members 66 and an internal ring 67 fixed in the chamber 61. A passageway 68 is formed across the ring 67 and is in communication through the ports 69 with the dashpot chambers 70 which are filled with a suitable fluid. A pin 71 may be mounted within the passage 68 to form a relatively restricted course for fluid being transferred between the dashpot chambers. A resilient spring 72 is seated against the dashpot piston element 64 and at its other end surrounds a pilot portion 73 on the closure member 74 for the cavity 61. This closure member is retained within the cavity by any suitable means such as the snap ring 75.

The valve housing is provided with an annular flange or a pair of ears 76 through which suitable means such as the bolts 77 may pass to removably secure the valve housing to the side wall of the air dome 4. It will be noted that the pilot portion 34 of the housing projects through the necessary opening in the side wall of the air dome to expose the respective valve stems 40 and 42 and the control plunger portion 50 in the interior of the air spring.

Means mounted internally of the air spring is provided for controlling reciprocation of the valve actuating plunger and includes a follower lever assembly 78 comprising a support plate 79 having an opening formed therein for seating on and about the pilot portion 34 of the valve housing and against the inner surface of the side wall of the air dome 4 to which it may be secured by any suitable means. The support plate 79 includes a pair of spaced legs 80 outstanding from the inner wall of the air dome, and through which a rotatable shaft 81 is supported. An angularly shaped follower lever 82 is splined or otherwise secured to one end of the shaft 81 and at its other end carries a roller 83, which may be made of nylon, for engagement with the metal cap structure 24 disposed over the piston diaphragm 12. In addition, an arm 84 is welded or otherwise secured to the shaft 81 and follower lever 82 and includes a portion 85 spaced from and substantially parallel to the shaft 81. Thus, the arm 84 is adapted for rotation with the shaft 81 as the follower lever is rotated, stop means 86 being stamped out of the support bracket 79 for engagement with the arm portion 85 as it moves in a clockwise direction in Figure 1.

A substantially U-shaped plunger control member includes the axially spaced arms 87 and 87a rotatably supported upon the shaft 81 and interconnected by an integral portion 88 which is substantially parallel to the shaft 81 and adjacent the arm portion 85. A plunger control lever or finger 89 is formed as an integral extension of the arm 87a to a point opposite the end of the plunger portion 50. Suitable bushings 90 properly space the arm 87a on the shaft 81. A resilient axially wound spring 91 is disposed about the bushings 90 between the arm members 87a and 87 and includes an end portion 92 mounted for engagement with the member 88, and another end 93 adapted to be engaged by the portion 85 of arm 84. This spring forms a resilient one-way drive between the arm 84 and the finger 89 to drive the latter clockwise in Figure 3 to reciprocate the plunger inwardly of the valve housing.

The valve assembly is mounted on the air spring as shown with reference to a particular desired vehicle standing height; that is, with respect to a height at which it is desired that the sprung portion of the vehicle will be maintained relative to the unsprung portion. Thereafter, as vehicle occupants enter or alight from the vehicle, or as the suspension is subjected to dynamic loading, the piston 6 and the air dome 4 will reciprocate relative to each other thereby varying the volume of the air spring. Thus, as the piston reciprocates from the full line standing height position to the dotted line position in Figure 1, which corresponds for example to an increase in the static load of the sprung mass, it is necessary to supply air into the air spring to again raise the sprung mass to its desired height relative to the unsprung vehicle portion. As occupants alight from the vehicle, conversely, the piston will move outwardly of the air dome necessitating the exhaust of air from the spring to lower the sprung mass relative to the unsprung vehicle portion.

For the sake of the description of the operation of this mechanism, it may be assumed that with the assembly in the solid line position of Figure 1, the vehicle is at the desired standing height. At this time, the spring 72 acting through the dashpot mechanism 62 urges the plunger 48 out of the housing 28. However, the relative positioning of the piston and cylinder elements of the spring is such that the finger 89 will engage the end of the plunger portion 50 to preclude it from acting against the collar 60 on exhaust valve stem 42 to open it. Of course, since there is no direct connection between the control plate 52 and the inlet valve stem 40 the latter will also be closed. Thereafter, if the load on the sprung portion of the vehicle should increase thereby resulting in the piston moving to the dotted line position of Figure 1, the follower lever will be rotated to the dotted line position to rotate the arm 84 which acts through the resilient drive spring 91 to rotate the finger 89 to reciprocate the plunger 48 into the housing 28. In so moving, the finger 89 will abuttingly engage the inlet valve stem 40 to open this valve and permit air to be supplied to the interior of the spring. The dashpot mechanism 62, of course, operates to provide a time delay in the opening of the inlet valve. For example, it is undesirable to have a levelling valve which is immediately susceptible to opening and closing movement under conditions of dynamic loading. Thus, as the vehicle traverses irregular or rough terrain, the levelling valve mechanism would be repeatedly and rapidly opened and closed thereby requiring relatively large amounts of air. By utilizing the dashpot mechanism or one similar to it, the levelling valve mechanism will not respond to such conditions of rapid wheel oscillation for short durations.

If the vehicle sprung mass is now unloaded, the follower lever will move back and beyond the solid line position of Figure 1, thereby moving the arm 84 toward the stop 86. There is no drive in this direction between the follower lever and the finger 89. However, the spring 72 acting through the dashpot mechanism 62 will urge the plunger 48 outwardly of the housing until such time as the arcuate arm 56 picks up the collar 60 on exhaust valve stem 42 to open the exhaust valve, as shown in Figure 4. Then, as the air dome again settles down about the piston to the solid line position of Figure 1, the cam roller will be moved to position the finger 89 to a position maintaining the standing height wherein both inlet and exhaust valves are closed.

It should be noted, particularly, that by utilizing a levelling valve construction and operating mechanism of the type herein disclosed, the levelling valve may be removably mounted upon the air spring so as to be easily removable therefrom for maintenance and replacement. All that is necessary is to detach the bolts 77 and manually remove the housing 28. Thus, this construction satisfies the principal object of this invention in providing a levelling valve mechanism which has the advantages of an internally mounted system while the advantage of accessibility of an externally mounted system. Naturally, the form of the invention herein shown has been selected merely for illustrative purposes and is not intended in any way to limit the scope of the invention which is defined by the claims which follow.

We claim:

1. In combination with a variable volume fluid spring of the type comprising a piston element reciprocably disposed within an inflexible cylinder element, a valve mechanism for controlling the flow of fluid to and from said spring; said mechanism comprising a valve housing, inlet and exhaust valve means disposed within said housing, means for controlling selective actuation of said valve means including an actuating member reciprocably disposed within said housing and operatively engageable with said valve means, a portion of said actuating member extending out of said housing, means for demountably supporting said housing on said spring cylinder element whereby said reciprocable actuating member is exposed in the interior of said spring, and means operatively engageable with said actuating member for controlling reciprocation of the latter comprising a spring urged follower lever mounted within said spring and responsive to variation in the volume of the latter.

2. In combination with a variable volume fluid spring of the type comprising a piston element reciprocably disposed within an inflexible cylinder element, a valve mechanism for controlling the flow of fluid to and from said spring; said mechanism comprising a valve housing, inlet and exhaust valve means disposed within said housing and each including actuable members projecting from said housing, means for controlling selective actuation of said valve means including an actuating member movably disposed within said housing and including a control member extending out thereof for operating said actuable members, movement of said actuating member in one direction controlling one of said valves and in the other direction the other valve, means for demountably supporting said housing on said spring whereby said actuable valve members and actuating control member are contained within said spring, and means engageable with said actuating member for controlling movement of the latter comprising a follower lever mounted within said spring and spring urged into engagement with said piston element.

3. In combination with a variable volume fluid spring of the type comprising a piston element reciprocably disposed within a rigid cylinder element, a valve mechanism for controlling the flow of fluid to and from said spring; said mechanism comprising a valve housing, inlet and exhaust valve means disposed within said housing and each including actuable members projecting from said housing, means for controlling selective actuation of said valve means including an actuating member reciprocably disposed within said housing and selectively operable upon said actuable valve members, means for demountably supporting said housing on said spring whereby said actuating member is exposed to the interior of said spring, and means operatively connected to said actuating member for controlling movement of the latter comprising a follower arm mounted within said spring and spring biased in a direction effecting response to variation in the volume of said spring.

4. In combination with a variable volume fluid spring of the type comprising a piston element reciprocably disposed within a cylinder element, a valve mechanism for controlling the flow of fluid to and from said spring; said mechanism comprising a valve housing, inlet and exhaust one-way valve means disposed within said housing and each including actuable members projecting from said housing, means for controlling selective operation of said valve means including a member reciprocably disposed within said housing having an actuating portion extending out thereof for engagement with said actuable members, said controlling means including means connecting said control portion to the respective actuable valve members for one-way drive thereof, means for demountably supporting said housing on said spring whereby said actuable valve members and actuating control member are contained within said spring, and means for controlling reciprocation of said actuating member comprising a follower lever rotatably mounted within said spring and responsive to movement of one of said elements.

5. In combination with a variable volume fluid spring of the type comprising a piston element reciprocably disposed within a cylinder element, a valve mechanism for controlling the flow of fluid to and from said spring; said mechanism comprising a valve housing, inlet and exhaust valve means reciprocably disposed within said housing, means for controlling selective operation of said valve means including a member reciprocably disposed within said housing having an actuating portion thereof extending out of said housing, said controlling means including drive means connecting said actuating portion to said valve means whereby reciprocable movement of said member in one direction operates one of said valve means and in the other direction the other valve means, spring means urging reciprocation of said actuating member in one direction, means for demountably supporting said housing on said spring whereby said actuating member is exposed in the interior of said spring, and means for controlling reciprocation of said actuating member in said one direction under the influence of said spring means and for driving said member in the other direction comprising a follower member within said fluid spring engageable with said actuating member and responsive to variation in the volume of said fluid spring.

6. In combination with a variable volume fluid spring of the type comprising a piston element reciprocably disposed within a cylinder element, a valve mechanism for controlling the flow of fluid to and from said spring; said mechanism comprising a valve housing, inlet and exhaust valve means disposed within said housing, means for controlling selective operation of said valve means including an actuating member movably disposed within said housing, drive means for connecting said actuating member to one of said valve means for opening the latter upon movement of said actuating member in one direction, resilient means in said housing urging said actuating member in said one direction, said controlling means including drive means for connecting said actuating member to the other of said valve means for opening the latter upon movement of said actuating member in the other direction, means for limiting movement of said actuating member in said one direction and for driving said actuating member in said other direction, said means comprising a follower member operatively engageable with said actuating member and disposed within said spring for movement in response to variation in the volume of the latter.

7. In combination with a variable volume fluid spring of the type comprising a piston element reciprocably disposed within a cylinder element, a valve mechanism for controlling the flow of fluid to and from said spring; said mechanism comprising a valve housing, inlet and exhaust valve means disposed within said housing, means for controlling selective operation of said valve means including an actuating member reciprocably disposed within and projecting out of said housing, said controlling means including drive means connecting said actuating member to one of said valve means for opening the latter upon movement of said actuating member out of said housing and drive means connecting said actuating member to the other of said valve means for opening the latter upon movement of said actuating member into said housing, a spring in said housing urging said actuating member out of said housing, means for limiting reciprocation of said actuating member out of said housing and for driving said member into said housing, said means comprising a follower member disposed within said fluid spring for movement in response to movement of one of said fluid spring elements, said follower member being engageable with the portion of said actuating member projecting from said housing.

8. In combination with a variable volume fluid spring of the type comprising a piston element reciprocably disposed within a cylinder element, a valve mechanism for controlling the flow of fluid to and from said spring; said mechanism comprising a valve housing, inlet and exhaust valve means disposed within said housing, means for controlling selective operation of said valve means including an actuating member reciprocably disposed within and projecting out of said housing, said controlling means including drive means connecting said actuating member to one of said valve means for opening the latter upon movement of said actuating member out of said housing and drive means connecting said actuating member to the other of said valve means for opening the latter upon movement of said actuating member into said housing, a spring in said housing urging said actuating member out of said housing, means for limiting reciprocation of said actuating member out of said housing and for driving said member into said housing, said means comprising a follower member disposed within said fluid spring for movement in response to movement of one of said fluid spring elements, said follower member being engageable with the portion of said actuating member projecting from said housing, and means for demountably securing said housing to said fluid spring whereby said actuating member is disposed within the interior of said fluid spring adjacent said follower member.

9. In combination a levelling valve mechanism removably mounted upon a variable volume fluid spring of the type comprising a piston element reciprocably disposed within a cylinder element, said valve mechanism controlling the flow of fluid to and from said spring; said mechanism comprising a valve housing, inlet and exhaust valves disposed within said housing and including valve operating stems projecting out of said housing, a valve controlling plunger reciprocably disposed within said housing, said plunger having an external portion projecting out of said housing, a valve actuating member disposed on the external portion of said plunger, said member having a lost motion connection with one of said valve stems whereby reciprocation of said plunger in one direction actuates the valve associated with said stem, spring means disposed within said housing and operatively engaging said plunger to urge the latter in said one direction to actuate said one valve, said control member being movable into abutting engagement with the stem of the other of said valves to open the latter upon reciprocation of said plunger in the other direction, means for demountably securing said housing on one of said spring elements whereby said valve stems and control plunger are exposed in the interior of said fluid spring, means for controlling reciprocation of said plunger comprising a follower lever rotatably disposed within said spring and operatively connected to said piston element for movement in response to movement of one of said spring elements, said lever including means engageable with said plunger.

10. In combination with a vehicle comprising a load supporting sprung mass, an unsprung mass, a fluid spring for resiliently supporting said sprung mass upon said unsprung mass, said spring comprising a cylinder element secured to said sprung mass and a piston element reciprocably disposed therein and secured to said unsprung mass, valve mechanism for controlling the flow of fluid into and out of said spring to maintain a substantially constant standing height of said sprung mass relative to said unsprung mass; said mechanism including a valve housing, an inlet valve disposed within said housing, an exhaust valve disposed within said housing, each of said valves including an actuable member projecting out of said housing, valve actuating means disposed within said housing, said means including a plunger reciprocably disposed within said housing and including an external portion extending out of said housing, means forming a one-way driving connection between said external portion and one of said valve actuable members whereby reciprocation of said plunger in one direction will open said one valve, means mounted on said external portion for abutting engagement with the other valve actuable member to open the latter upon reciprocation of said plunger in the other direction, spring means in said housing normally urging said plunger in said one direction, means mounting said housing on the exterior of said cylinder element with said actuable valve members and external plunger portion extending into the interior thereof; means mounted externally of said housing for controlling reciprocation of said plunger, said control means comprising a rotatable shaft mounted on the interior of said cylinder element, a plunger controlling finger rotatably mounted on said shaft for movement into engagement with said plunger or away from the latter, a follower lever fixed to said shaft and pivotally movable with said piston element, and a one-way spring drive connecting said follower lever to said finger to move the latter into operative engagement with said plunger.

References Cited in the file of this patent

UNITED STATES PATENTS

| | | |
|---|---|---|
| 2,147,990 | Richter | Feb. 21, 1939 |
| 2,361,575 | Thompson | Oct. 31, 1944 |
| 2,607,611 | Allison | Aug. 19, 1952 |
| 2,670,201 | Rossman | Feb. 23, 1954 |
| 2,844,386 | Pribonic | July 22, 1958 |